US005969619A

United States Patent [19]

Niemiro et al.

[11] Patent Number: 5,969,619

[45] Date of Patent: Oct. 19, 1999

[54] LIQUID LEVEL CONTROL SYSTEM

[75] Inventors: Thaddeus A. Niemiro, Lisle; Thomas W. Orzechowski, Orland Park; Frederick J. Whiting, LaGrange; John W. Manser, Elgin, all of Ill.

[73] Assignee: Goss Graphic Systems, Inc., Westmont, Ill.

[21] Appl. No.: 09/007,511

[22] Filed: Jan. 15, 1998

[51] Int. Cl.[6] .......... G08B 21/00

[52] U.S. Cl. .......... 340/618; 340/616; 340/612; 137/393

[58] Field of Search .......... 340/618, 612, 340/614, 616, 626; 137/393, 386, 805; 73/290 R, 299

[56] References Cited

U.S. PATENT DOCUMENTS

| | | | |
|---|---|---|---|
| 2,665,706 | 1/1954 | Hansen | 137/373 |
| 2,687,740 | 8/1954 | Jarund | 137/110 |
| 3,137,137 | 6/1964 | Kalle | 60/326 |
| 3,277,914 | 10/1966 | Manion | 137/805 |
| 3,344,804 | 10/1967 | Lyman | 137/406 |
| 3,545,481 | 12/1970 | Fratalia | 137/387 |
| 3,581,754 | 6/1971 | Adams | 137/805 |
| 4,211,249 | 7/1980 | Richards | 137/393 |
| 4,407,159 | 10/1983 | Wytaniec | 73/290 R |
| 4,484,601 | 11/1984 | Campau | 137/805 |
| 4,607,658 | 8/1986 | Fraser et al. | 137/393 |
| 5,583,544 | 12/1996 | Stamer et al. | 347/7 |

*Primary Examiner*—Daniel J. Wu
*Assistant Examiner*—Simong Huang
*Attorney, Agent, or Firm*—Marshall, O'Toole, Gerstein, Murray & Borun

[57] ABSTRACT

In order to control the delivery of a liquid to a vessel, a liquid level control system includes a regulated supply of low pressure air delivered to an air supply tube which extends to a liquid vessel for discharging the low pressure air at a preselected level within the liquid vessel. The control system also includes a sensor sensing fluctuations in air pressure at an intermediate point along the air supply tube. In particular, the sensor senses a first air pressure when the liquid is below the preselected level and sensing a second, higher air pressure when the liquid is at or above the preselected level. The sensor is in communication with the liquid supply source to produce a signal upon sensing the second, higher air pressure in the air supply tube. When the higher pressure is sensed, the sensor sends the signal it produced and the liquid supply source is responsive to the signal to stop supplying liquid to the liquid vessel.

19 Claims, 1 Drawing Sheet

LIQUID LEVEL CONTROL SYSTEM

FIELD OF THE INVENTION

The present invention is generally directed to control systems and, more particularly, a control system for maintaining the liquid level in a vessel.

BACKGROUND OF THE INVENTION

As is known in the art, it is common to provide a liquid in a vessel that is utilized, e.g., in a commercial process of one type or another. The vessel may suitably serve as a source of supply for the liquid in which case it will be important in many instances to maintain a desired level of the liquid within the vessel. By way of example, a printing press is known to require a source of ink that must be continuously replenished in the course of a printing operation.

Most commonly, control systems for maintaining the level of liquid in a vessel have utilized a float element that is supported on the surface of the liquid. This type of control system depends upon the float element riding up and down as the level of the liquid fluctuates within the vessel to activate respective off and on switches to control suitable valves for selectively replenishing the liquid from a remote source. More specifically, the actuation of the switches that control the valves is typically accomplished either mechanically or by energizing a proximity sensing device.

Generally speaking, such control systems are well proven and quite reliable for most applications. However, they are known to be unsuitable for use in an ink environment. Basically, this is due to the fact that ink has a high viscosity and tack which causes it to adhere to the float element.

Because of these characteristics of ink, the buoyancy and weight of the float element in this type of control system is known to change dramatically. As a result of these changes in buoyancy and weight, the control system is known to be difficult, at best, to maintain in calibration within an ink environment.

As an alternative to float-type control systems, it is also generally known that ultrasound instruments have been utilized to control the level of liquid in a vessel. The ultrasound instruments function by detecting an acoustic wave which is reflected from a surface of the liquid in the vessel and by measuring the time which elapses between the emission and detection of the wave to thereby calculate the distance of the liquid surface from the instrument. Unfortunately, the ultrasound instruments are quite unreliable in an ink environment inasmuch as the ink surface is quite irregular preventing a proper reflection of the acoustic wave.

The present invention is directed to overcoiming one or more of the foregoing problems and achieving one or more of the resulting objects.

SUMMARY OF THE INVENTION

It is a principal object of the present invention to provide a control system which is capable of maintaining the level of a liquid within a vessel in a highly accurate manner. It is a further object of the present invention to provide a liquid level control system that is highly accurate and easily maintains its calibration independent of the environment. It is an additional object of the present invention to provide a control system for use in an ink environment that is not susceptible to deviation due to the physical characteristics of ink.

Accordingly, the present invention is directed to a liquid level control system which includes means for producing a regulated supply of low pressure air and which has an air supply tube in communication with the low pressure air supply means. The air supply tube extends from the low pressure air producing means to a liquid vessel for discharging the low pressure air at a preselected level within the liquid vessel. The liquid level control system also includes means for supplying liquid to the liquid vessel when the liquid is below the preselected level within the liquid vessel and further includes means for sensing, fluctuations in air pressure in the air supply tube intermediate the low pressure air producing means and the liquid vessel. The sensing means senses a first air pressure when the liquid is below the preselected level and senses a second, higher air pressure when the liquid is at or above the preselected level. With these features of construction, the sensinig means is in communication with the liquid supplying means to send a signal to the liquid supplying means upon sensing the second, higher air pressure to stop supplying liquid to the liquid vessel.

More specifically, the liquid level control system is such that the liquid supplying means normally supplies liquid to the liquid vessel but responds to the signal from the sensing means whenever the supply tube is at the second, higher pressure to stop supplying liquid to the liquid vessel.

In an exemplary embodiment, the low pressure air producing means comprises a source of air under pressure which is in communication with the air supply tube upstream of the sensing means. Preferably, the low pressure air producing means then further comprises an air pressure regulating valve which is in communication with the air supply tube upstream of the sensing means. Alternatively, the low pressure air producing means comprises an air blower having an exhaust manifold which is in communication with the air supply tube upstream of the sensing means. Advantageously, the low pressure air producing means then further comprises a damper which is associated with the exhaust manifold of the air blower to ensure the regulated supply of low pressure air.

As for other details of the present invention, the air supply tube preferably discharges the low pressure air therefrom into an enlarged tubular element having a closed upper end and an open lower end positioned at the preselected level within the liquid vessel. The enlarged tubular element may then advantageously comprise a generally cylindrical wall extending downwardly from the closed upper end to the open lower end to define a low pressure air receiving chamber. As for the sensing means, it preferably comprises an air flow meter having a pressure-responsive floating element in an internal chamber which is movable between a first position and a second position depending upon the air pressure which is sensed in the air supply tube.

More specifically, the floating element in the internal chamber of the air flow meter is preferably disposed in a first, lower position within the air flow meter when the low pressure air in the air supply tube is at the first air pressure. Additionally, the floating element is advantageously disposed in a second, higher position within the air flow meter when the low pressure air in the air supply tube is at or above a second, higher pressure. With these characteristics, the liquid level control system preferably includes a proximity switch adjacent the second position of the floating element for sending the signal to the liquid supplying means when the floating element is disposed in the second position.

Other objects, advantages and features of the present invention will become apparent from a consideration of the following specification taken in conjunction with the accompanying drawings.

DETAILED DESCRIPTION OF THE PREFERRED EMBODIMENTS

Figures 1, 2:
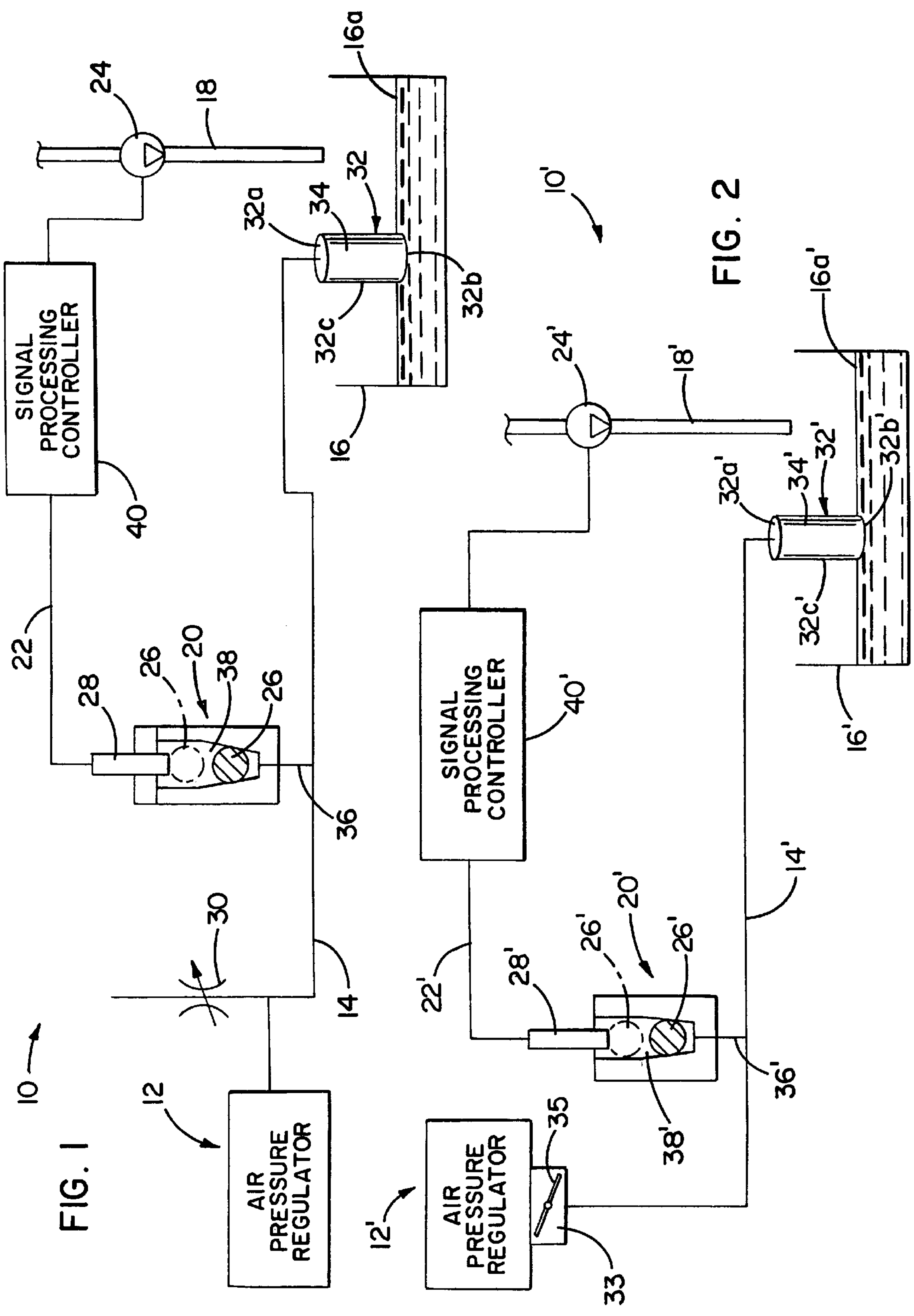
FIG. 1 is a schematic view of a first embodiment of liquid level control system in accordance with the present invention.
FIG. 2 is a schematic view of a second embodiment of liquid level control system in accordance with the present invention.

In the illustrations given, and with reference first to FIG. 1, the reference numeral 10 designates generally a liquid level control system in accordance with the present invention. The liquid level control system 10 is particularly well suited for use as an ink level control system of the pneumatic type since it utilizes neither a floating element that is in contact with the ink nor an ultrasound approach that would be unreliable because of the irregularities that are common on the surface of ink in a vessel. In particular, the present invention utilizes a low pressure air supply that is entirely capable of accurately determining the instantaneous level of ink in a vessel, as will be described in detail hereinafter.

Still referring to FIG. 1, the control system 10 includes means for producing, a regulated supply of low pressure air, generally designated 12, which is in communication with an air supply tube 14. The air supply tube 14 extends from the low pressure air producing means 12 to an ink vessel 16 for discharging low pressure air into the ink vessel 16 at a preselected level **16*a* within the ink vessel 16. In the embodiment which is illustrated in FIG. 1, the low pressure air producing means 12** comprises a source of air under pressure such as a conventional shop air pressure regulator or the like.

As will also be seen, the control system 10 includes means for supplying ink to the ink vessel 16 when the ink is below the preselected level **16*a* within the ink vessel 16. This may comprise an ink supply tube 18 that leads from a supply tank (not shown) to the ink vessel 16. Further, the control system 10 includes means for sensing fluctuations in air pressure in the air supply tube 14 intermediate the low pressure air producing means 12 and the ink vessel 16**.

In particular, the sensing means, generally designated 20, senses a first air pressure in the air supply tube 14 when the ink is below the preselected level **16*a* and senses a second, higher pressure in the air supply tube 14 when the ink is at or above tie preselected level 16*a*. The sensing means 20 is in communication with the ink supplying means 18 to send a signal, e.g., through the signal-transmitting line 22, to the ink supplying means 18 upon sensing the second, higher air pressure. As illustrated, the ink supplying means 18 can include a valve 24 which nonnally permits ink to be supplied to the ink vessel 16 but is responsive to the signal from the sensing means 20 to stop supplying ink to the ink vessel 16 whenever the air supply tube 14** is at the second, higher pressure.

As for the sensing means 20, it comprises an air flow meter having a floating element 26 movable between a first, lower position (shown in solid lines) and a second, higher position (shown in hidden lines) depending upon the air pressure in the air supply tube 14. The floating element 26 is disposed in the first position (solid lines) within the air flow meter 20 when the low pressure air in the air supply tube 14 is at the first air pressure, and the floating element 26 is disposed in the second position (hidden lines) within the air flow meter 20 when the low pressure air in the air supply tube 14 is at or above a second, higher pressure. As also shown, the sensing, means 20 includes a proximity switch 28 adjacent the second position (hidden lines) of the floating element 26 for sending the signal to the ink supplying means 18 through the signal-transmitting line 22 when the floating element 26 is disposed in the second position.

In the embodiment illustrated in FIG. 1, the low pressure air producing means 12 comprising the source of air under pressure is in communication with the air supply tube 14 upstream of the sensing means 20. Advantageously, the low pressure air is at a pressure in the range of between 0.0and 1.0 in. $H_2O$ which is normally hard to achieve, e.g., with a shop air pressure source. To overcome this difficulty, the low pressure air producing means 12 advantageously further includes an air pressure regulating valve 30 which is in communication with the air supply tube 14 upstream of the sensing means 20.

As will be appreciated, the air supply tube 14 discharges the low pressure air into an enlarged tubular element 32 having a closed upper end **32*a* and an open lower end 32*b*. The open lower end 32*b* of the enlarged tubular element 32 is advantageously positioned at the preselected level 16*a* for the ink within the ink vessel 16. In addition, the enlarged tubular element 32 preferably includes a generally cylindrical wall 32*c* extending downwardly from the closed upper end 32*a* to the open lower end 32*b* to define a low pressure air receiving chamber 34**.

Referring now to FIG. 2, an ink level pneumatic control system 10' is illustrated which is substantially similar to the ink level pneumatic control system 10 described above. The control system 10' also includes an air supply tube 14' extending from a source of air under pressure (which will be described below) and extending to an ink vessel 16' for discharging low pressure air into the ink vessel 16' at a preselected level **16*a*', and it further includes means for supplying ink to the ink vessel 16', generally designated 18', as well as means for sensing fluctuations in air pressure in the air supply tube 14', generally designated 20'. As with the embodiment illustrated in FIG. 1, the sensing, means 20' sends a signal to the ink supplying means 18' through a signal-transmitting line 22' to a valve 24'** under certain conditions.

More specifically, the sensing, means 20' has a floating element 26'which is disposed in a first, lower position (solid lines) when the low pressure air in the air supply tube 14' is at the first air pressure. Furthermore, the floating element 26' is disposed in a second, higher position (hidden lines) whenever the low pressure air in the air supply tube 14' is at or above a second, higher pressure.

As a result, a proximity switch 28' adjacent the second position (hidden lines) of the floating element 26' serves to send a signal through the signal-transmitted line 22' when the floating element 26' is disposed in the second position.

When the signal is received by the valve 24', it closes to at least temporarily stop supplying ink to the ink vessel 16'. This occurs when the sensing means 20' senses the second, higher air pressure in the air supply tube 14' which is the condition whenever the ink in the ink vessel 16' is at or above the preselected level **16*a*'. Otherwise, the valve 24' is open permitting ink to continually flow through tile ink supply means 18' into the ink vessel 16'**.

As for the low pressure air producing means 12', it comprises an air blower rather than a shop air pressure regulator. The air blower 12' may comprise a commercially available air blower such as, for example, one sold under Stock No. 4C443 in Catalog 387 of W. W. Grainger Inc. (1996), and the air blower 12' preferably includes an exhaust manifold 33 that is in communication with the air supply tube 14 at a point located upstream of the sensing means 20'. Additionally, a damper 35 is advantageously associated with the exhaust manifold 33 of the air blower 12' to ensure a regulated supply of low pressure air.

As will be appreciated, the sensing means 20 and 20' both comprise air flow meters which are in communication with their respective air flow tubes 14 and 14' through respective sensing tubes 36 and 36'. The air flow meters 20 and 20' may advantageously be constructed to include respective generally V-shaped chambers 38 and 38' which are actually frustoconical to permit an unrestricted floating movement of the respective floating elements 26 and 26' between the first and second positions therefor, although it will be understood that the chambers may also be formed to have other shapes and configurations. Because of the regulated low pressure air supply, and the responsiveness of the floating elements 26 and 26', respectively, the air flow meters 20 and 20' sense small changes in pressure within the air supply tubes 14 and 14'.

As previously indicated in the discussion above, the required air pressure range is between 0.0 and 1.0 in. $H_2O$. Advantageously, the low pressure air is supplied at an air pressure of approximately 0.75 in. $H_2O$ when the ink level in the ink vessels 16 and 16' is below the predetermined levels 16*a* and 16*a*'. When the ink level rises above the predetermined levels 16*a* and 16*a*', the open lower ends 32*b* and 32*b*' of the enlarged tubular elements 32 and 32' are covered. The pressure in the air supply tubes 14 and 14' then rises to approximately the 0.75 in. $H_2O$ level which causes the floating elements 26 and 26' to rise from the first, lower positions (solid lines) to the second, higher positions (hidden lines). When this occurs, the proximity switches 28 and 28' are activated to send the signals to the valves 24 and 24' to stop supplying ink to the ink vessels 16 and 16'.

In actual practice, the proximity switches 28 and 28' will usually not send signals directly to the valves 24 and 24' unless the valves are electrically controlled solenoid valves or the like. Instead, the signals from the proximity switches 28 and 28' will be carried by the signal-transmitting lines 22 and 22' to intermediate signal processing controllers 40 and 40' that interface with the valves 24 and 24' to control the opening and closing thereof. In other words, the signal processing controllers 40 and 40' can be of a conventional type that utilizes an electrical signal to mechanically control the opening and closing of the valves 24 and 24'.

While in the foregoing there have been set forth preferred embodiments of the invention, it will be appreciated that the details herein given may be varied by those skilled in the art without departing from the true spirit and scope of the appended claims.

What is claimed is:

1. A liquid level control system, comprising:

means for producing a regulated supply of low pressure air;

an air supply tube in communication with said low pressure air producing means and extending to a liquid vessel for discharging said low pressure air into said liquid vessel at a preselected level within said liquid vessel;

means for supplying liquid to said liquid vessel when said liquid is below said preselected level within said liquid vessel; and means for sensing fluctuations in air pressure in said air supply tube intermediate said low pressure air producing means and said liquid vessel;

said sensing means sensing a first air pressure in said air supply tube when said liquid is below said preselected level and sensing a second, higher air pressure in said air supply tube when said liquid is at or above said preselected level, said sensing means being in communication with said liquid supplying means to send a signal to said liquid supplying means upon sensing said second, higher air pressure, said liquid supplying means normally supplying liquid to said liquid vessel but responding to said signal from said sensing means whenever said supply tube is at said second, higher pressure to stop supplying liquid to said liquid vessel.

2. The liquid level control system of claim 1 wherein said low pressure air producing means comprises a source of air under pressure which is in communication with said air supply tube upstream of said sensing means.

3. The liquid level control system of claim 1 wherein said low pressure air producing means comprises an air blower having an exhaust manifold which is in communication with said air supply tube upstream of said sensing means.

4. The liquid level control system of claim 1 wherein said air supply tube discharges said low pressure air therefrom into an enlarged tubular element having a closed upper end and an open lower end positioned at said preselected level within said liquid vessel.

5. The liquid level control system of claim 1 wherein said sensing means comprises an air flow meter having a pressure-responsive floating element movable between a first position and a second position depending upon the air pressure in said air supply tube.

6. A liquid level control system, comprising:

means for producing a regulated supply of low pressure air;

an air supply tube in communication with said low pressure air producing means and extending to a liquid vessel for discharging said low pressure air into said liquid vessel at a preselected level within said liquid vessel;

means for supplying liquid to said liquid vessel when said liquid is below said preselected level within said liquid vessel; and means for sensing fluctuations in air pressure in said air supply tube intermediate said low pressure air producing means and said liquid vessel;

said sensing means sensing a first air pressure in said air supply tube when said liquid is below said preselected level and sensing a second, higher air pressure in said air supply tube when said liquid is at or above said preselected level, said sensing means being in communication with said liquid supplying means to send a signal to said liquid supplying means upon sensing said second, higher air pressure, said liquid supplying means normally supplying liquid to said liquid vessel but responding to said signal from said sensing means whenever said air supply tube is at said second, higher pressure to stop supplying liquid to said liquid vessel;

said sensing means comprising an air flow meter having a floating element movable between a first position and a second position depending upon the air pressure in said air supply tube, said floating element being disposed in a first position within said air flow meter when said low pressure air in said air supply tube is at said first air pressure, said floating element being disposed in a second position within said air flow meter when said low pressure air in said air supply tube is at or above a second, higher pressure, and including a proximity switch adjacent said second position of said floating element for sending said signal to said liquid supplying means when said floating element is disposed in said second position.

7. The liquid level control system of claim 6 wherein said low pressure air producing means comprises a source of air under pressure which is in communication with said air supply tube upstream of said sensing means.

8. The liquid level control system of claim 7 wherein said low pressure air producing means further comprises an air pressure regulating valve which is in communication with said air supply tube upstream of said sensing means.

9. The liquid level control system of claim 6 wherein said low pressure air producing means comprises an air blower having an exhaust manifold which is in communication with said air supply tube upstream of said sensing means.

10. The liquid level control system of claim 9 wherein said low pressure air producing means further comprises a damper which is associated with said exhaust manifold of said air blower to ensure said regulated supply of low pressure air.

11. The liquid level control system of claim 6 wherein said air supply tube discharges said low pressure air therefrom into an enlarged tubular element having a closed upper end and an open lower end positioned at said preselected level within said liquid vessel.

12. The liquid level control system of claim 11 wherein said enlarged tubular element comprises a generally cylindrical wall extending downwardly from said closed upper end to said open lower end to define a low pressure air receiving chamber.

13. An ink level pneumatic control system, comprising:

means for producing a regulated supply of low pressure air;

an air supply tube in communication with said low pressure air supply means and extending to an ink vessel for discharging said low pressure air into said ink vessel at a preselected level within said ink vessel;

means for supplying ink to said ink vessel when said ink is below said preselected level within said ink vessel; and means for sensing fluctuations in air pressure in said air supply tube intermediate said low pressure air producing means and said ink vessel;

said sensing means sensing a first air pressure in said air supply tube when said ink is below said preselected level and sensing a second, higher air pressure in said air supply tube when said ink is at or above said preselected level, said sensing means being in communication with said ink supplying means to send a signal to said ink supplying means upon sensing said second, higher air pressure, said ink supplying means normally supplying ink to said ink vessel but responding to said signal from said sensing means whenever said air supply tube is at said second, higher pressure to stop supplying ink to said ink vessel;

said sensing means comprising an air flow meter having a floating element movable between a first position and a second position depending upon the air pressure in said air supply tube, said floating element being disposed in a first position within said air flow meter when said low pressure air in said air supply tube is at said first air pressure, said floating element being disposed in a second position within said air flow meter when said low pressure air in said air supply tube is at or above a second, higher pressure, and including a proximity switch adjacent said second position of said floating element for sending said signal to said ink supplying means when said floating element is disposed in said second position.

14. The ink level pneumatic control system of claim 13 wherein said low pressure air producing means comprises a source of air under pressure which is in communication with said air supply tube upstream of said sensing means.

15. The ink level pneumatic control system of claim 14 wherein said low pressure air producing means further comprises an air pressure regulating valve which is in communication with said air supply tube upstream of said sensing means.

16. The ink level pneumatic control system of claim 13 wherein said low pressure air producing means comprises an air blower having an exhaust manifold which is in communication with said air supply tube upstream of said sensing means.

17. The ink level pneumatic control system of claim 16 wherein said low pressure air producing means further comprises a damper which is associated with said exhaust manifold of said air blower to ensure said regulated supply of low pressure air.

18. The ink level pneumatic control system of claim 13 wherein said air supply tube discharges said low pressure air therefrom into an enlarged tubular element having a closed upper end and an open lower end positioned at said preselected level within said ink vessel.

19. The ink level pneumatic control system of claim 18 wherein said enlarged tubular element comprises a generally cylindrical wall extending downwardly from said closed upper end to said open lower end to define a low pressure air receiving chamber.

* * * * *